United States Patent
Welker

(10) Patent No.: US 10,884,142 B2
(45) Date of Patent: Jan. 5, 2021

(54) PELLET-START PROCESS FOR MAKING TRANSVERSE ANDERSON LOCALIZATION OPTICAL ELEMENT

(71) Applicant: Incom, Inc., Charlton, MA (US)

(72) Inventor: David James Welker, Vancouver, WA (US)

(73) Assignee: Incom, Inc., Charlton, MA (US)

(*) Notice: Subject to any disclaimer, the term of this patent is extended or adjusted under 35 U.S.C. 154(b) by 161 days.

(21) Appl. No.: 16/164,951

(22) Filed: Oct. 19, 2018

(65) Prior Publication Data
US 2020/0124746 A1    Apr. 23, 2020

(51) Int. Cl.
| | |
|---|---|
| G01T 1/203 | (2006.01) |
| B29D 11/00 | (2006.01) |
| G01T 1/20 | (2006.01) |
| B29K 33/00 | (2006.01) |
| B29K 25/00 | (2006.01) |

(52) U.S. Cl.
CPC ........ *G01T 1/203* (2013.01); *B29D 11/00721* (2013.01); *G01T 1/2002* (2013.01); *B29K 2025/06* (2013.01); *B29K 2033/12* (2013.01)

(58) Field of Classification Search
CPC .. B29D 11/00721; G01T 1/203; G01T 1/2002
See application file for complete search history.

(56) References Cited

U.S. PATENT DOCUMENTS

| | | | |
|---|---|---|---|
| 4,867,531 A * | 9/1989 | Parker | B29D 11/00663 385/145 |
| 4,973,565 A | 11/1990 | Fine | |
| 2010/0264322 A1 | 10/2010 | Levene et al. | |
| 2017/0016996 A1 * | 1/2017 | Welker | B29D 11/00682 |
| 2018/0267235 A1 | 9/2018 | Russell et al. | |

FOREIGN PATENT DOCUMENTS

| | | |
|---|---|---|
| WO | 2014113100 | 7/2014 |
| WO | 2018014009 | 1/2018 |

OTHER PUBLICATIONS

Karbasi, Salman et al., "Observation of transverse Anderson localization in an optical fiber", article in Optics Letters, Jun. 2012.
Pla-Dalmau, Anna et al., "Low-cost extruded plastic scintillator", Nuclear Instruments and Methods in Physics Research A 466 pp. 482-491, 2001.

* cited by examiner

*Primary Examiner* — Mathieu D Vargot
(74) *Attorney, Agent, or Firm* — BainwoodHuang

(57) ABSTRACT

A method of making a transverse Anderson localization (TAL) element includes mixing pellets together to make a mixture, the pellets being of two or more distinct materials having respective wave speeds effective to provide Anderson guiding. The mixture is fused to make a preform which has respective pellet-size areas of the distinct materials corresponding to the pellets in the mixture. One or more stretching operations is performed to stretch the preform into the TAL element.

15 Claims, 5 Drawing Sheets ured optical elements such as optical fibers and faceplates, and more particularly to techniques for manufacturing optical elements providing light guidance using the phenomenon of transverse Anderson localization (TAL) of propagating light.
PELLET-START PROCESS FOR MAKING TRANSVERSE ANDERSON LOCALIZATION OPTICAL ELEMENT

BACKGROUND

The present invention is related to the field of manufacturing optical elements such as optical fibers and faceplates, and more particularly to techniques for manufacturing optical elements providing light guidance using the phenomenon of transverse Anderson localization (TAL) of propagating light.

One known method for making TAL elements begins with conventional preforms of different materials, which are drawn two or more fibers into channels on a spinning take up wheel. These collectively form first preforms. The fiber bundles of the channels are fused to make second preforms, which are used in a subsequent cane draw to make canes. The canes are packed into a channel and fused to make yet a third preform, which is drawn into final canes which are packed and fused to form a block or billet that may itself be a final product or may be used in additional processing to make a final product.

SUMMARY

There are drawbacks to known methods of making TAL elements, such as the process described above. These drawbacks include the need for multiple draws and packing steps, which contribute to contamination and thermal degradation. Also, in a process using multiple simultaneous fiber draws, there can be undesirable small-scale material buildup in the final product that interferes with performance. Such material buildup can result from static generating properties of the fibers (interferes with desired fiber placement in double-fiber drawing) and difficulty in maintaining matched tension for the different fibers.

A disclosed method of making a transverse Anderson localization (TAL) element includes first, for a preform, (1) mixing pellets together to make a mixture, the pellets including pellets of two or more distinct materials having respective wave speeds effective to provide Anderson guiding in the TAL element, and (2) fusing the mixture to make the preform, the preform having areas of the distinct materials corresponding to the pellets in the mixture. Subsequently, one or more stretching operations are performed to stretch the preform into the TAL element. This general technique is not limited to any particular type of materials (i.e., they may by other than polymer) or wave type (they may be other than optical and other than electromagnetic, e.g., acoustic waves).

A disclosed method of making a polymer transverse Anderson localization (TAL) optical element begins with mixing optical polymer pellets together to make a mixture, the optical polymer pellets including pellets of two or more distinct optical materials having respective distinct optical refractive indexes effective to provide Anderson light guiding in the TAL optical element. The mixture is fused to make a first preform which has respective pellet-size areas of the distinct optical materials corresponding to the pellets in the mixture. Using the first preform, a first draw (e.g., fiber draw) is performed to make an optical fiber, and fiber segments of the optical fiber are fused to make a second preform. A second draw (e.g., cane draw) is performed to draw the second preform into a TAL optical element. This may be followed by additional processing to make a final product, as described in examples herein.

Advantages of the disclosed technique include the following:

Pellets are relatively inexpensive compared to the same material in extruded form (e.g., rods).

Only two draws are needed, for example one fiber draw into channels and one cane draw into canes. This can reduce thermal degradation by reducing the number of times the material is heated. Additionally, the technique avoids the need for multi-fiber draws (e.g., double draws).

Only one hand pack is needed.

There is no material buildup as seen in the multiple-fiber process.

It is relatively easy to incorporate other materials into the mixture, such as scintillating materials used for optical devices having a detection function (e.g., X-ray detectors). For example, such materials may be provided in powder form, and the powder mixed with the pellets prior to the mixture being fused.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
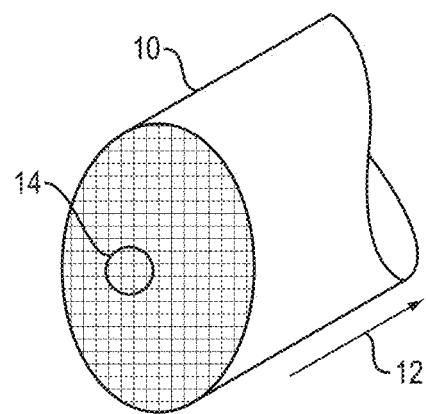
FIG. 1 is a schematic depiction of a Transverse Anderson Localization (TAL) optical element, also referred to as an optical waveguide.

FIG. 1 is a schematic depiction of an optical waveguide 10, which may be realized in a manner as described more below. The waveguide 10 is an arrangement of optically transmissive material that provides longitudinal waveguiding along a transmission axis 12 with a random distribution of refractive indices transverse to the axis 12, i.e., across the two-dimensional extent orthogonal to the axis 12. This arrangement is effective to localize a transverse extent of light propagating in the optical waveguide. It is believed that the waveguiding effect in the waveguide 10 is a phenomenon referred to as "Transverse Anderson Localization", which is referred to herein as TAL. The waveguide 10 is realized without use of separate cladding as is used in other known optical waveguide structures. As described more below, the waveguide 10 may also incorporate a conversion/active material that generates light within the waveguide 10 by interaction with incident stimuli received into the optical waveguide 10. An example of a conversion/active material is a scintillating material that emits light when absorbing ionizing radiation. FIG. 1 also indicates a section 14 of the optical waveguide 10, which is described below with reference to FIG. 2.

Figure 2:
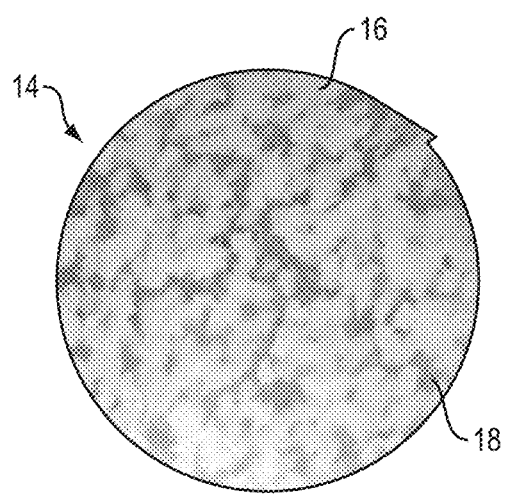
FIG. 2 is an image of a cross-sectional area of the TAL optical element.

FIG. 2 is a magnified view of a section 14 of the optical waveguide 10. In this case the waveguide 10 is composed of two materials, indicated by lighter areas 16 and darker areas 18 respectively. The two materials have different indexes of refraction. Specific examples are discussed below. The materials are arranged so that the refractive index has an essentially random distribution across the transverse direction. In FIG. 2 the two materials are mixed at approximately a 60/40 ratio. Alternative ratios are possible, as mentioned below. Additionally, it is possible to use more than two materials of respective distinct optical indexes, i.e., as many as six materials or more.

The description of the materials as having different refractive indexes relates to use in connection with optical signals in particular. It will be appreciated that more generally the different materials should have respective distinct wave speeds for Anderson localization. This formulation applies more readily to other types of signals, such as acoustic signals for example. As described more fully below, the two materials are initially in pellet form, and the pellets of the two materials are mixed together to make a preform that is then drawn into an optical element that forms part or all of the optical waveguide 10. In the drawing process, each pellet becomes thinned and stretched out by several orders of magnitude, becoming a strand-like region of the elongated structure. These strand-like regions are randomly distributed across the cross section of the optical element, due to the random mixing of the pellets prior to fusing and drawing. This random distribution of distinct regions corresponding to different pellets is illustrated in FIG. 2, in which the lighter regions 16 correspond to pellets of one type and the darker regions 18 correspond to pellets of a second type.

"Pellets" as used herein refers to small pieces of a material. In general they may be of any shape, although in many cases they may be shaped like small cylinders. In one example they are about 2.5 mm long and 2 mm wide. In one embodiment, the starting pellets may have sizes on the order of 2-3 mm. Those skilled in the art will appreciate that there is a relationship between the starting pellet size, the extent of elongation in the drawing process, and the nanoscale cross sections of the resulting regions of a finished optical element (e.g., on the order of 200 nm). As an example, drawing a 3" preform into a 100 um fiber represents a 1000:1 drawing ratio. When multiple draws are performed as described herein, higher overall ratios can be obtained, making the regions 16, 18 of sufficiently small cross section for Anderson guiding (e.g., 50 to 450 nm).

Figure 3:
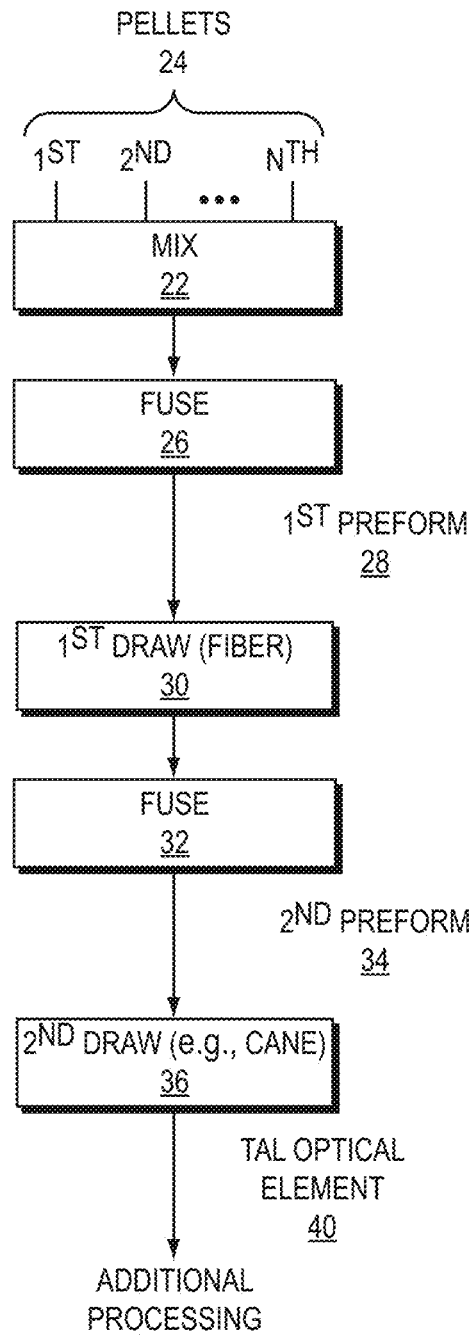
FIG. 3 is a flow diagram of a process for making a TAL optical element.

FIG. 3 is a flow diagram for a process 20 of making an optical element as outlined above. The process 20 begins with a mixing step 22 in which pellets 24 of different optical materials having respective optical indexes are mixed together. In FIG. 3 the different pellet types are shown as $1^{st}$, $2^{nd}$, ... Nth. In general, two or more materials are needed. In one example using two materials, one material may be poly(methyl methacrylate) (PMMA) and the other may be polystyrene. The raw polymer pellets are mixed in a desired ratio.

At 26, the mixture is fused to form a first preform 28. For this step, a fusing chamber such as described below may be utilized. The fusing is done in a non-homogenizing way, so that the non-homogeneity of the pellet mixture is substantially retained. This is in contrast to an extrusion process, for example, in which the pellets are heated and travel down a long screw that acts like a blender to form a homogeneous flowing plastic extrusion. Examples of non-homogenizing fusing are described below. The first preform 28 formed in this manner may be a generally cylindrical solid having a random distribution of pellet-size areas of respective optical materials from corresponding pellets 24.

At 30, the first preform 28 is used in a first drawing process, which is a fiber draw process yielding an optical fiber. The elongated fiber is collected onto a wheel, preferably having a set of outer flat areas for forming respective segments of the loops of fiber. These forming areas are also referred to as "channels". The fiber segments are separated into separate bundles, and each bundle is fused in a second fusing step 32 which may utilize the same fusing chamber as at 26. Each fused bundle forms a respective second preform 34. At 36, the preform 34 is used in a second drawing process, which in one embodiment is a cane draw that yields a collection of optical canes. Each optical cane constitutes a TAL optical element 40 capable of providing Anderson light guiding. Typically, however, such canes are intermediate products used in additional processing to create final products that are also TAL optical elements. Examples are discussed below.

Regarding the fusing at steps 26 and 32, the following are important aspects of whatever apparatus is employed:
  Vacuum environment to eliminate gases from the preform
  Provision for heating and compressing the polymer mixture during fusing. Heating may be provided by a heated platen as described below. Pressure can be applied using various techniques such as weights, springs, hydraulics, pressurized air bladders, electromechanical actuators, etc.
  The size of the fusing chamber should be such that elements size can be reduced down to Anderson region (50 nm-650 nm) in only two draws. Good results can be obtained with element sizes around 350 nm; an ideal range may be even smaller. Based on current drawing techniques, the fusing chamber should be such that it makes a preform about 3 inches in diameter or larger. For fusing a pellet mixture as described herein, a preform 5 inches or larger may be preferable.
  Ideally the volume of the fused preform is such that it can completely fill the channels in the next processing step. If not there is a chance of having a line show up in the canes from changing preforms.

Figure 4:
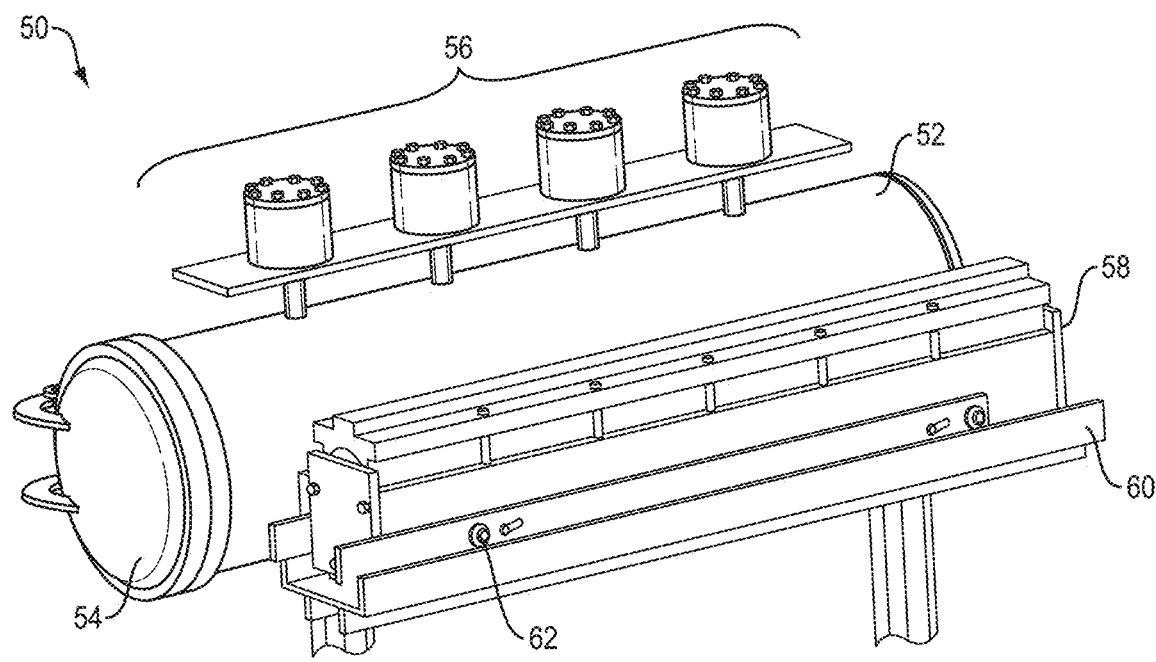
FIG. 4 is an isometric view of fusing chamber apparatus, with internal structure shown outside the chamber for ease of description.
Figure 5:
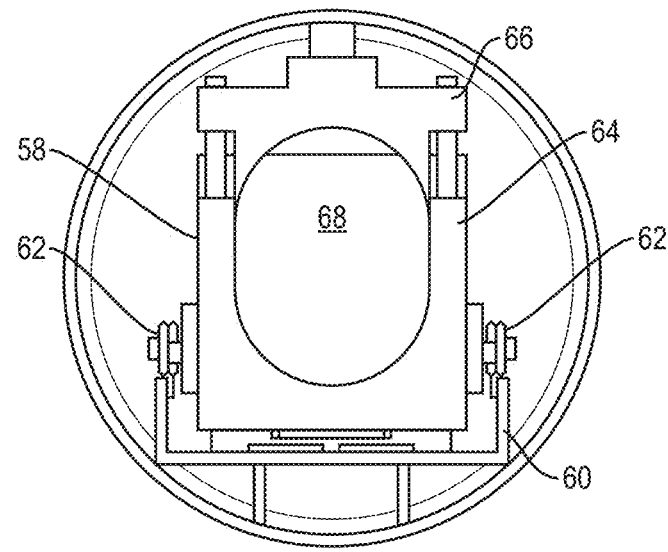
FIG. 5 is an end view of the fusing chamber with internal structure therein.

FIGS. 4-5 show example fusing apparatus 50. It includes a cylindrical chamber 52 with a sealed access door 54 at one end and a set of pressure actuators 56. Additional structure resides within the chamber 52 as shown in cross section in FIG. 5; this structure is shown outside the chamber 52 in FIG. 4 for ease of description. This structure includes an elongated press 58 sitting on a heated platen 60. The platen 60 may be fixed within the chamber 52, while the press 58 can be moved in and out by action of rollers 62. As best seen in FIG. 5, the press 58 has a lower member 64 and upper member 66 which together define an oval-section cavity 68 that retains the pellet or other mixture during fusing. The upper member 66 is mechanically coupled to the pressure actuators 56 (FIG. 4), which act to push the upper member 66 downward to create fusing pressure during operation. Also during operation the platen 60 is heated to maintain the mixture at a desired fusing temperature. The platen 60 may incorporate resistive heating elements for this purpose, with heating occurring by passing electric current through the heating elements.

Figure 6:
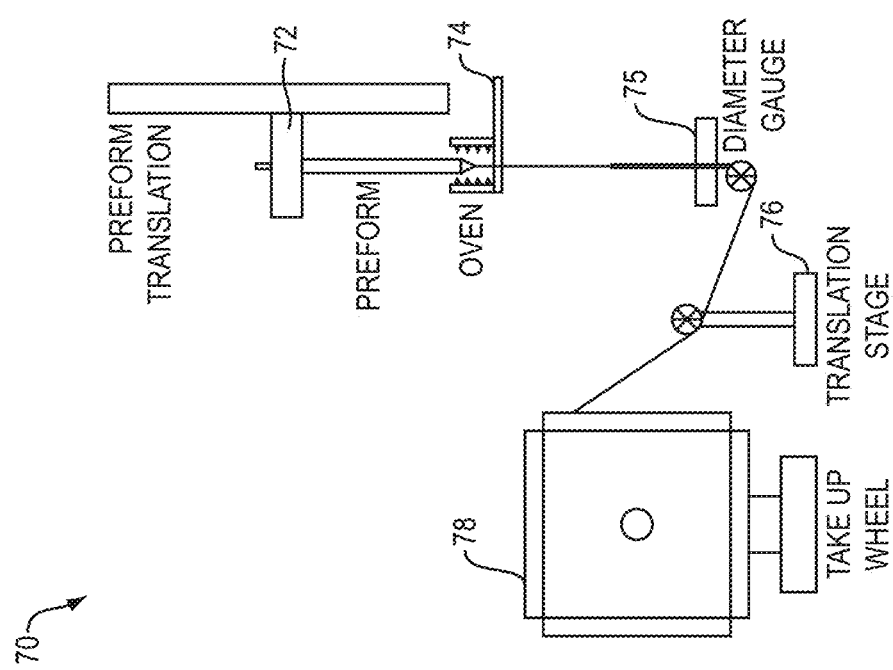
FIG. 6 is a schematic view of a fiber drawing tower.

FIG. 6 shows an example of a drawing tower 70 for fiber drawing. This type of drawing tower may be used in the first draw 30 in the process of FIG. 3. This example tower 70 has preform translation 72, oven 74, diameter gauge 75, translation stage 76, and take-up wheel 78 on which the drawn fiber(s) are collected. In this example the take-up wheel 78 has a square shape with four linear sections about its periphery.

Figure 7:
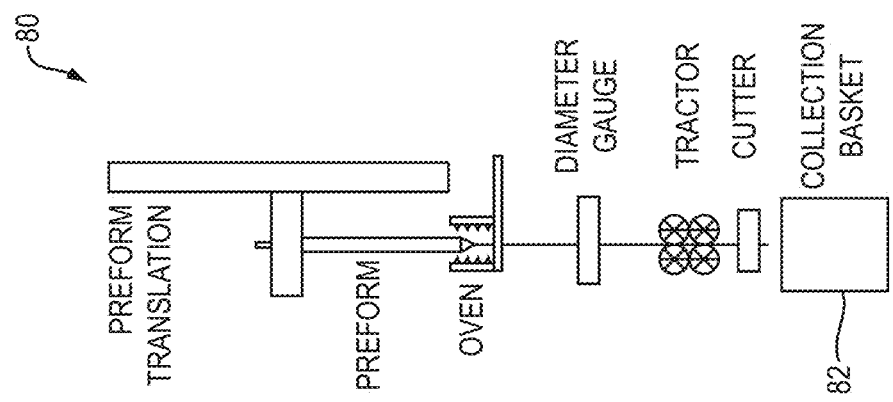
FIG. 7 is a schematic view of a cane drawing tower.

FIG. 7 shows an example of a drawing tower 80 for cane drawing. The major difference from the fiber drawing tower 70 is the use of a collection basket 82. During a drawing operation (e.g., 36), short segments referred to as "canes" are repeatedly cut and collected in the basket 82.

Figure 8:
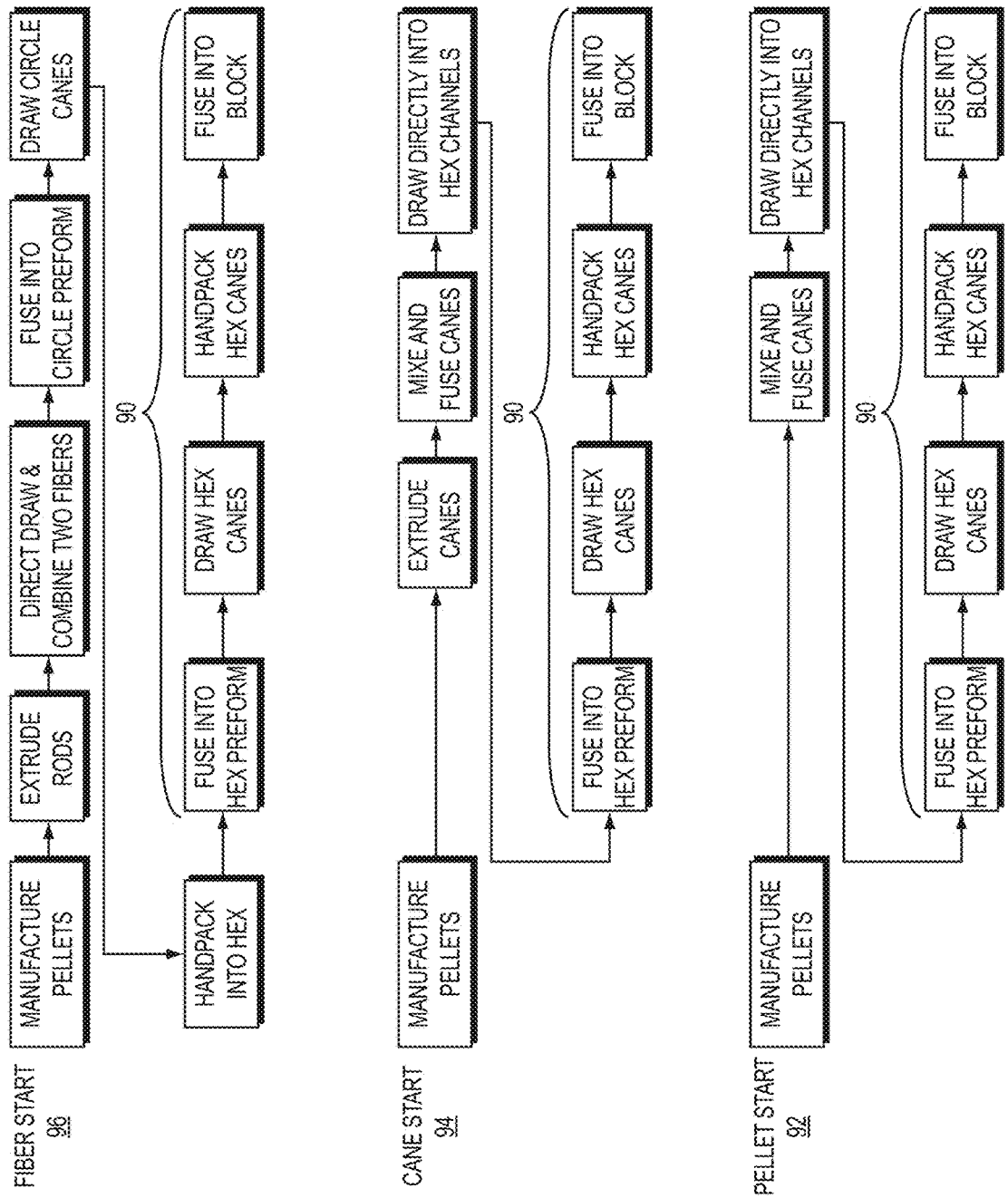
FIG. 8 is a flow diagram depicting three overlapping techniques for making TAL optical elements with pellet start.

FIG. 8 describes three different but overlapping manufacturing techniques that may be used for making a block-like TAL optical element, which may itself serve as a preform or another type of intermediate work product. These processes all begin with pellets and all use the same last four steps 90—fusing fibers or canes into a hexagonal ("hex") preform (second preform 34), drawing hex canes ($2^{nd}$ draw 36), handpacking the hex canes and fusing the packed canes into a block or billet. The preform doesn't necessarily need to be hex shaped, as many other shapes may also pack well. Typically such a block is not itself the final product, but may be sliced into thin slices that become the final products, such as waveguiding faceplates used in image detection and other applications. The three processes vary in the middle. The pellet start 92 is simplest, requiring just mixing and fusing of the pellets (steps 22 and 26 of FIG. 3) and drawing into hex channels ($1^{st}$ draw 30). The cane start 94 requires first extruding the pellets into canes, which are mixed and fused and then drawn into hex channels. A cane start 94 can be useful when any scintillating material to be included is available only in rod or cane form, rather than as a powder than can be incorporated into the pellet mixture. The fiber start 96 is most involved, requiring the extruding of rods, drawing these into two fibers and fusing them into a circular preform, then drawing into circular canes and handpacking these in a hex shape for input to the hex-preform fusing step.

While various embodiments of the invention have been particularly shown and described, it will be understood by those skilled in the art that various changes in form and details may be made therein without departing from the scope of the invention as defined by the appended claims.

What is claimed is:

1. A method of making a transverse Anderson localization (TAL) element, comprising:
   for a preform, (1) mixing pellets together to make a non-homogeneous pellet mixture including pellets of two or more distinct materials having respective distinct wave speeds effective to provide Anderson guiding in the TAL element, and (2) fusing the pellet mixture to make the preform, the fusing being done in a non-homogenizing way to retain the non-homogeneity of the pellet mixture and to produce the preform having pellet-size areas of the distinct materials corresponding to the pellets in the pellet mixture; and
   performing one or more stretching operations to stretch the preform into the TAL element.

2. The method of claim 1, wherein the pellets are optical polymer pellets and the distinct materials are respective optical polymer materials having respective distinct optical refractive indexes effective to provide Anderson light guiding in the TAL element as a TAL optical element.

3. The method of claim 2, wherein the stretching operations include:
   performing a first draw of the first preform into an optical fiber;
   fusing fiber segments of the optical fiber together to make a second preform; and
   performing a second draw to draw the second preform into the TAL optical element.

4. The method of claim 3, wherein the second draw is a cane draw producing a cane as the TAL optical element.

5. The method of claim 4, wherein the cane draw produces a set of canes each being a TAL optical element.

6. The method of claim 5, further including (1) fusing the canes of the set of canes together to make a block, and (2) processing the block to make one or more final products, each final product also being a TAL optical element.

7. The method of claim 6, wherein the processing includes slicing the block transversely into waveguiding faceplates as the final products.

8. The method of claim 2, wherein the mixing step includes incorporating a scintillating material into the pellet mixture, the scintillating material being effective to convert non-light radiation into light guided by the Anderson light guiding.

9. The method of claim 8, wherein the non-light radiation is x-ray radiation and scintillating material is an x-ray scintillating material.

10. The method of claim 8, wherein the scintillating material is provided in powder form and mixed together with the optical pellets.

11. The method of claim 10, wherein the mixing includes use of a fluid carrier to enhance even distribution of the powder-form scintillating material throughout the pellet mixture.

12. The method of claim 2, wherein the fusing is performed using an evacuated fusing chamber having a heated press therein, the press defining a cavity into which the pellet mixture is placed, the heated press applying heating and a fusing pressure to the pellet mixture to achieve the fusing.

13. The method of claim 2, wherein the optical materials include poly(methyl methacrylate) and polystyrene.

14. The method of claim 2, wherein one or more of the pellets in the pellet mixture contains active dopants.

15. The method of claim 14, wherein the dopants are scintillating dopants.

\* \* \* \* \*